(12) United States Patent
Ryu et al.

(10) Patent No.: US 11,223,040 B2
(45) Date of Patent: Jan. 11, 2022

(54) NEGATIVE ACTIVE MATERIAL AND LITHIUM BATTERY INCLUDING THE SAME

(71) Applicant: SAMSUNG SDI CO., LTD., Yongin-si (KR)

(72) Inventors: Seungwook Ryu, Yongin-si (KR); Sungho Lee, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 120 days.

(21) Appl. No.: 14/882,483

(22) Filed: Oct. 14, 2015

(65) Prior Publication Data

US 2016/0141608 A1    May 19, 2016

(30) Foreign Application Priority Data

Nov. 14, 2014    (KR) .................. 10-2014-0158903

(51) Int. Cl.
*H01M 4/36*    (2006.01)
*H01M 4/38*    (2006.01)
(Continued)

(52) U.S. Cl.
CPC ............. *H01M 4/366* (2013.01); *H01M 4/38* (2013.01); *H01M 4/386* (2013.01); *H01M 4/387* (2013.01); *H01M 4/42* (2013.01); *H01M 4/463* (2013.01); *H01M 4/485* (2013.01); *H01M 4/505* (2013.01); *H01M 4/525* (2013.01); *H01M 4/58* (2013.01); *H01M 4/131* (2013.01); *H01M 4/134* (2013.01); *H01M 4/136* (2013.01); *H01M 2004/027* (2013.01)

(58) Field of Classification Search
CPC ...... H01M 4/366; H01M 4/386; H01M 4/485; H01M 4/505; H01M 4/525
See application file for complete search history.

(56) References Cited

U.S. PATENT DOCUMENTS 9,172,093 B2    10/2015   Chu et al.
9,178,214 B2    11/2015   Mah et al.
(Continued)

FOREIGN PATENT DOCUMENTS

JP    2005-310487 A    11/2005
JP    2006-019309 A    1/2006
(Continued)

OTHER PUBLICATIONS

Korean Office action dated Dec. 11, 2020 by the Korean Intellectual Property Office for corresponding Korean Patent Application No. 10-2014-0158903.
(Continued)

*Primary Examiner* — Ula C Ruddock
*Assistant Examiner* — Frank A Chernow
(74) *Attorney, Agent, or Firm* — Lee IP Law, P.C.

(57) ABSTRACT

Provided are a negative active material and a lithium battery including the negative active material. The negative active material includes a non-carbonaceous core allowing doping or undoping of lithium ion; and a double coating layer formed on at least one portion of a surface of the non-carbonaceous core and including a first coating layer including a metal and a second coating layer including a metal oxide or a metal nitride.

8 Claims, 3 Drawing Sheets

(a) STRESS DISTRIBUTION AFTER COATING (b) STRESS DISTRIBUTION AFTER CHARGING

(51) Int. Cl.
*H01M 4/42* (2006.01)
*H01M 4/525* (2010.01)
*H01M 4/505* (2010.01)
*H01M 4/485* (2010.01)
*H01M 4/46* (2006.01)
*H01M 4/58* (2010.01)
*H01M 4/131* (2010.01)
*H01M 4/136* (2010.01)
*H01M 4/134* (2010.01)
*H01M 4/02* (2006.01)

(56) References Cited

U.S. PATENT DOCUMENTS

| | | | |
|---|---|---|---|
| 9,553,305 B2 | 1/2017 | Joo et al. | |
| 2005/0237029 A1* | 10/2005 | Takezawa | B60L 3/0046 320/135 |
| 2009/0162750 A1 | 6/2009 | Kawakami et al. | |
| 2011/0076565 A1* | 3/2011 | Cho | H01M 4/0473 429/231.8 |
| 2011/0086271 A1 | 4/2011 | Lee et al. | |
| 2011/0136012 A1* | 6/2011 | Yagi | H01M 4/0423 429/231.1 |
| 2012/0100438 A1 | 4/2012 | Fasching et al. | |
| 2014/0045060 A1 | 2/2014 | Park et al. | |

FOREIGN PATENT DOCUMENTS

| | | |
|---|---|---|
| JP | 2007-273459 A | 10/2007 |
| JP | 2009-104901 A | 5/2009 |
| KR | 10-2010-0063747 A | 6/2010 |
| KR | 10-2011-0040478 A | 4/2011 |
| KR | 10-2012-0089512 A | 8/2012 |
| KR | 10-2012-0114561 A | 10/2012 |
| KR | 10-2012-0139450 A | 12/2012 |
| KR | 10-2013-0062105 A | 6/2013 |
| KR | 10-2014-0001905 A | 1/2014 |
| KR | 10-2014-0022253 A | 2/2014 |
| KR | 10-2014-0114227 | 9/2014 |

OTHER PUBLICATIONS

Korean Notice of Allowance dated May 28, 2021.
Puurunen, J. Appl. Phys. 97, 121301 (2005).

* cited by examiner (a) STRESS DISTRIBUTION
AFTER COATING (b) STRESS DISTRIBUTION
AFTER CHARGING

NEGATIVE ACTIVE MATERIAL AND LITHIUM BATTERY INCLUDING THE SAME

CROSS-REFERENCE TO RELATED APPLICATION

Korean Patent Application No. 10-2014-0158903, filed on Nov. 14, 2014, in the Korean Intellectual Property Office, and entitled: "Negative Active Material and Lithium Battery Including The Same," is incorporated by reference herein in its entirety.

BACKGROUND

1. Field

One or more exemplary embodiments relate to negative active materials and lithium batteries including the negative active materials.

2. Description of the Related Art

Lithium secondary batteries that may be used in portable electronic communication devices such as personal digital assistants (PDAs), mobile phones, and laptop computers, electric bicycles, and electric automobiles may have a discharge voltage greater than, e.g., at least twice those of, comparative batteries, and the lithium secondary batteries may have high energy density.

SUMMARY

Embodiments may be realized by providing a negative active material, including a non-carbonaceous core allowing doping or undoping of lithium ion; and a double coating layer formed on at least one portion of a surface of the non-carbonaceous core and including a first coating layer including a metal and a second coating layer including a metal oxide or a metal nitride.

The first coating layer may be disposed on the surface of the non-carbonaceous core, and the second coating layer may be disposed on the first coating layer.

The metal in the first coating layer may include one or more of Li, Al, Sn, Ca, Sc, Ti, V, Cr, Mn, Fe, Co, Ni, Cu, Zn, Sr, Y, Zr, Nb, Ba, Lu, Hf, Ta, or Lanthanum group elements.

The metal oxide or metal nitride in the second coating layer may include an oxide or nitride of one or more of Li, Al, Sn, Ca, Sc, Ti, V, Cr, Mn, Fe, Co, Ni, Cu, Zn, Sr, Y, Zr, Nb, Ba, Lu, Hf, Ta, or Lanthanum group elements.

The metal oxide or metal nitride in the second coating layer may include an oxide or nitride of the metal in the first coating layer.

The first coating layer may include Li, and the second coating layer may include $Li_2O$.

A thickness of the first coating layer may be in a range of about 0.1 nm to about 0.1 μm.

A thickness of the second coating layer may be in a range of about 0.1 nm to about 1 μm.

The non-carbonaceous core may include Si; $SiO_x$ (0<x<2); a Si—Z alloy, where Z is an alkali metal, an alkali earth metal, an element of Groups XIII to XVI, a transition metal, a rare earth element, or a combination thereof except for Si, Sn, or $SnO_2$, the Si—Z alloy having a Si-based alloy structure including an inactive matrix including Si and one or more of an element of Groups II to XIV except for Si, and active Si nanoparticles dispersed in the inactive matrix; a Sn—Z alloy, where Z is an alkali metal, an alkali earth metal, an element of Groups XIII to XVI, a transition metal, a rare earth element, or a combination thereof except for Sn; or a combination thereof.

An average particle diameter of the non-carbonaceous core may be in a range of about 1 nm to about 50 μm.

The negative active material may further include a crystalline carbonaceous material.

The non-carbonaceous core coated with the double coating layer and the crystalline carbonaceous material may be mixed in a weight ratio of about 0.99:0.01 to about 0.01:0.99.

Embodiments may be realized by providing a lithium battery, including a negative electrode including the presently disclosed negative active material; a positive electrode opposite the negative electrode; and an electrolyte between the negative electrode and the positive electrode.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
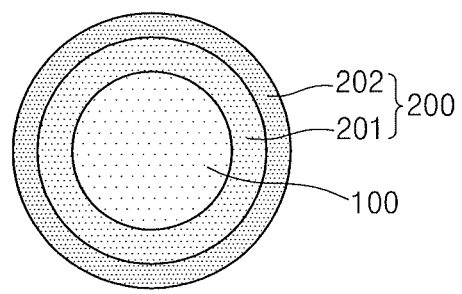
FIG. 1 illustrates a conceptual diagram of a negative active material according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description. Expressions such as "at least one of" when preceding a list of elements, modify the entire list of elements and do not modify the individual elements of the list. In the drawing figures, the dimensions of layers and regions may be exaggerated for clarity of illustration.

Hereinafter, a negative active material and a lithium battery including the negative active material according to exemplary embodiments will be described in detail.

A negative active material according to an exemplary embodiment may include: a non-carbonaceous core that allows doping or undoping of lithium ion; and a double coating layer formed on at least one portion of a surface of the non-carbonaceous core and including a first coating layer having a metal and a second coating layer having a metal oxide or a metal nitride.

By forming the double coating layer on the surface of a high capacity non-carbonaceous core, the negative active material may reduce excessive stress caused by volumetric expansion and shrinkage of lithium ions during charging and discharging and prevent detachment of a negative electrode, and a lithium battery including a high capacity negative electrode forming material may have excellent lifespan characteristics.

The non-carbonaceous core may include a high capacity non-carbonaceous material to which lithium is doped or undoped that may be used as a negative active material of a lithium battery. The term "non-carbonaceous" refers to including at least 50% by weight of a negative active material that is not a carbonaceous material. For example, the non-carbonaceous core may include at least about 60% by weight, 70% by weight, 80% by weight, or 90% by weight of a non-carbonaceous material or may be formed of 100% by weight of a non-carbonaceous material.

Examples of the material that allows doping or undoping of lithium ion used in the non-carbonaceous core may include Si; $SiO_x$ (0<x<2); an Si—Z alloy, where Z is an alkali metal, an alkali earth metal, an element of Groups XIII to XVI, a transition metal, a rare earth element, or a combination thereof except for Si, Sn, or $SnO_2$; and a Sn—Z alloy, where Z is an alkali metal, an alkali earth metal, an element of Groups XIII to XVI, a transition metal, a rare earth element, or a combination thereof except for Sn, where at least one of these materials may be used in combination with $SiO_2$. Z may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), titanium (Ti), germanium (Ge), phosphorus (P), arsenic (As), antimony (Sb), bismuth (Bi), sulfur (S), selenium (Se), tellurium (Te), polonium (Po), or a combination thereof. Such non-carbonaceous nanoparticles may be used alone or in a combination of at least two thereof.

According to an embodiment, the non-carbonaceous core may include a Si—Z alloy, which may include a Si alloy structure including: an inactive matrix including Si and at least one element of Groups II to XIV except for Si; and active Si nanoparticles dispersed in the inactive matrix.

According to an embodiment, the non-carbonaceous core may be a Si-based particle such as Si; $SiO_x$ (0<x<2); a Si—Z alloy, where Z is an alkali metal, an alkali earth metal, an element of Groups XIII to XVI, a transition metal, a rare earth element, or a combination thereof except for Si. The Si-based particle may be amorphous silicon, crystalline (single crystalline and polycrystalline) silicon, or a mixture thereof. The Si-based particle may be used alone or a combination of at least two thereof. For example, silicon oxide such as $SiO_x$ (0<x<2) may be used as the Si-based particle, for example, due to low expansion rates during charging and discharging.

An average particle diameter of the non-carbonaceous core may be determined within a nano-side to micro-size range according to components included therein. The non-carbonaceous core may have an average particle diameter of, for example, about 1 nm to about 50 μm. When the non-carbonaceous core includes Si, the average particle diameter may be in a nano-size range of about 500 nm or less, for example, in a range of about 1 nm to about 100 nm, about 1 nm to about 50 nm, or about 1 nm to about 10 nm. When the non-carbonaceous core includes a Si alloy, e.g., a Si—Z alloy, the average particle diameter may be less than a micro-size range or less, e.g., about 20 μm or less, for example, in a range of about 1 nm to about 20 μm, about 0.1 μm to about 20 μm, or about 1 μm to about 10 μm.

The double coating layer may be formed on at least one portion of the surface of the non-carbonaceous core. The double coating layer may include a first coating layer including a metal and a second coating layer including a metal oxide or a metal nitride. The double coating layer may be formed on the entire surface of the non-carbonaceous core. The formation of the double coating layer may reduce excessive stress caused by volumetric expansion and shrinkage of the non-carbonaceous core during charging and discharging.

According to an exemplary embodiment, the first coating layer may be formed on the surface of the non-carbonaceous core, and the second coating layer may be formed on the first coating layer.

The first coating layer may include a metal capable of compensating for an amount of Li not contributing to charge/discharge reactions, for example, due to irreversible reactions of lithium. Examples of the metal may include one or more of Li, Al, Sn, Ca, Sc, Ti, V, Cr, Mn, Fe, Co, Ni, Cu, Zn, Sr, Y, Zr, Nb, Ba, Lu, Hf, Ta, or Lanthanum group elements.

The first coating layer may not only serve as a compensation layer for irreversible reactions of lithium but also react with the non-carbonaceous core after being deposited to induce expansion of the non-carbonaceous core first. The first coating layer may serve as a stress buffering layer of the non-carbonaceous core.

According to an exemplary embodiment, a thickness of the first coating layer may be in a range of about 0.1 nm to about 0.1 μm. For example, the thickness of the first coating layer may be in a range of about 0.1 nm to about 50 nm, about 1 nm to about 10 nm, or about 1 nm to about 5 nm. Maintaining a thickness of the first coating layer within ranges described above may help provide the first coating layer with efficient stress buffering functions.

The second coating layer, as an artificial solid electrolyte interface (SEI) layer, may include a metal oxide or a metal nitride. The second coating layer may inhibit volumetric expansion of the negative active material caused by intercalation of Li and may inhibit additional formation of the SEI layer through physical separation of the electrolytic solution from the negative active material.

A material used to form the second coating layer may be a material having high strength and high density, forming a stable film, and having Li ion conductivity. Examples of the metal oxide or metal nitride may include an oxide or nitride of one or more of Li, Al, Sn, Ca, Sc, Ti, V, Cr, Mn, Fe, Co, Ni, Cu, Zn, Sr, Y, Zr, Nb, Ba, Lu, Hf, Ta, or Lanthanum group elements.

According to an exemplary embodiment, the metal oxide or metal nitride contained in the second coating layer may be an oxide or nitride of the same metal contained in the first coating layer. For example, the first coating layer may include Li, and the second coating layer may include $Li_2O$.

According to an exemplary embodiment, a thickness of the second coating layer may be in a range of about 0.1 nm to about 1 μm. For example, the thickness of the second coating layer may be in a range of about 0.1 nm to about 100 nm, for example, in a range of about 1 nm to about 50 nm or about 1 nm to about 20 nm. Maintaining a thickness of the second coating layer within ranges described above may help provide a rigid and stable second coating layer.

FIG. 1 illustrates a schematic cross-sectional view of a negative active material according to an exemplary embodiment. Referring to FIG. 1, the negative active material may include a non-carbonaceous core 100 and a double coating layer 200. The double coating layer 200 may include a first coating layer 201 and a second coating layer 202. The first coating layer 201 may serve as a stress buffering layer, and the second coating layer 202 may serve as an artificial SEI layer.

Figure 2:
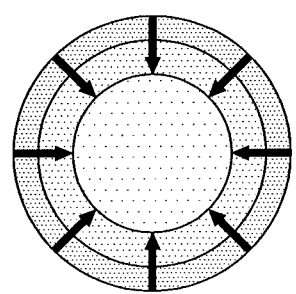
FIG. 2 illustrates a conceptual diagram for describing stress distribution by coating of a negative active material according to an exemplary embodiment.
Figure 2:
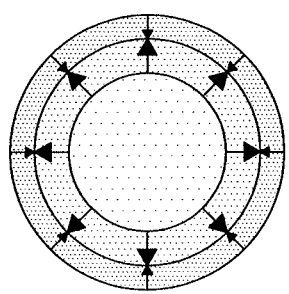

FIG. 2 illustrates a diagram for describing stress distribution obtained by coating the negative active material. As illustrated in FIG. 2(a), when the double coating layer 200 is formed on the non-carbonaceous core 100, the first coating layer 201, which may be a metal layer, may partially react with the non-carbonaceous core 100, and a large stress caused by the double coating layer 200 may be applied to the center of the non-carbonaceous core 100. When charging and discharging of lithium ions is initiated, volumetric expansion may be caused by intercalation of lithium to the non-carbonaceous core 100 as illustrated in FIG. 2(b). A stress toward the center may reduce a stress caused by the expansion, and volumetric expansion of the high capacity non-carbonaceous core 100 may be secondarily inhibited even after repeated charging and discharging by a rigid and stable second coating layer 202.

According to an exemplary embodiment, primary particles of the negative active material may aggregate or bind to each other or may be combined with another component of the negative active material to form secondary particles.

According to an exemplary embodiment, the negative active material may further include a crystalline carbonaceous material. The non-carbonaceous core having the double coating layer and the crystalline carbonaceous material may be used at a weight ratio of about 0.99:0.01 to about 0.01:0.99.

A negative electrode according to another exemplary embodiment may include the negative active material.

A lithium battery according to another exemplary embodiment may include: a negative electrode including the negative active material; a positive electrode disposed opposite to the negative electrode; and an electrolyte interposed between the negative electrode and the positive electrode.

The negative electrode may include the negative active material and may be manufactured, for example, by preparing a negative active material composition by mixing the negative active material, a binder, and optionally, a conductive agent in a solvent, and then molding the negative active material composition to a certain shape or coating the negative active material composition on a current collector, such as copper foil.

The negative electrode may further include a material used to form a negative active material of a lithium battery in addition to the aforementioned negative active material. For example, the material used to form a negative active material of a lithium battery may include one or more of lithium metal, a lithium-alloyable metal, a transition metal oxide, a non-transition metal oxide, or a carbonaceous material.

For example, the lithium-alloyable metal may include Si, Sn, Al, Ge, Pb, Bi, Sb, a Si—Y alloy, where Y is an alkali metal, an alkali earth metal, an element of Groups XIII to XVI, a transition metal, a rare earth element, or a combination thereof except for Si, and a Sn—Y alloy, where Y is an alkali metal, an alkali earth metal, an element of Groups XIII to XVI, a transition metal, a rare earth element, or a combination thereof except for Sn. Y may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), titanium (Ti), germanium (Ge), phosphorus (P), arsenic (As), antimony (Sb), bismuth (Bi), sulfur (S), selenium (Se), tellurium (Te), polonium (Po), or a combination thereof.

For example, the transition metal oxide may be, for example, lithium titanium oxide, vanadium oxide, or lithium vanadium oxide.

For example, the non-transition metal oxide may be, for example, $SnO_2$ or $SiO_x$ ($0<x<2$).

The carbonaceous material may include crystalline carbon, amorphous carbon, or a mixture thereof. Examples of the crystalline carbon include natural graphite or artificial graphite which may be in an amorphous, plate, flake, spherical or fibrous form. Examples of the amorphous carbon include, for example, soft carbon (carbon sintered at low temperatures), hard carbon, meso-phase pitch carbides, and sintered coke.

When the aforementioned negative active material and the carbonaceous material are used together, oxidation reaction of the silicon-based alloy may be inhibited, the SEI layer may be efficiently formed, a stable layer may be formed and electrical conductivity may be improved, and charging and discharging characteristics of lithium batteries may further be improved.

A material used to form the negative active material may be mixed with the aforementioned negative active material in a blended form, coated on the negative active material, or used with the negative active material in a combined form.

The binder used in the negative electrode active material composition may assist binding of the negative electrode active material to the conductive agent and to the current collector. The binder may be added thereto in an amount of about 1 to about 50 parts by weight based on 100 parts by weight of the negative active material. For example, the amount of the binder may be in a range of about 1 to about 30 parts by weight, about 1 to about 20 parts by weight, or about 1 to about 15 parts by weight based on 100 parts by weight of the negative active material. Examples of the binder may include polyvinylidene fluoride, polyvinylidene chloride, polybenzimidazole, polyimide, polyvinyl acetate, polyacrylonitrile, polyvinyl alcohol, carboxymethyl cellulose (CMC), starch, hydroxypropyl cellulose, regenerated cellulose, polyvinyl pyrrolidone, tetrafluoro ethylene, polyethylene, polypropylene, polystyrene, polymethyl methacrylate, polyaniline, acrylonitrilebutadienestyrene, phenol resin, epoxy resin, polyethylene terephthalate, polytetrafluoroethylene, polyphenylsulfide, polyamideimide, polyetherimide, polyethylenesulfone, polyamide, polyacetal, polyphenyleneoxide, polybutylene terephthalate, ethylene-propylene-diene terpolymer (EPDM), sulfonated EPDM, styrene butadiene rubber, a fluoride rubber, and various copolymers.

The negative electrode may further include a conductive agent in order to further improve electrical conductivity by providing a sufficient conductive passage to the negative active material. The conductive agent may be a conductive agent used in lithium batteries. Examples of the conductive agent include: a carbonaceous material such as carbon black, acetylene black, ketjen black, and carbon fiber (for example, a vapor phase growth carbon fiber); a metal such as, for example, copper, nickel, aluminum, or silver, each of which may be used in powder or fiber form; and a conductive material such as conductive polymer, e.g., a polyphenylene derivative, and a mixture thereof. An amount of the conductive agent may be appropriately controlled. For example, the conductive agent may be added in such an amount that a weight ratio of the negative active material to the conductive agent is in a range of about 99:1 to about 90:10.

Examples of the solvent include N-methylpyrrolidone (NMP), acetone, and water. The amount of the solvent may be in a range of about 1 to about 10 parts by weight based on 100 parts by weight of the negative active material. When the content of the solvent is maintained within this range, a process for forming the negative active material layer may be efficiently performed.

The current collector may be fabricated to have a thickness of about 3 to about 500 μm. The current collector may be one of various current collectors that does not cause a chemical change in the fabricated battery and has conductivity. Examples of the current collector include copper, stainless steel, aluminum, nickel, titanium, calcined carbon, copper or stainless steel that is surface-treated with carbon, nickel, titanium, or silver, and aluminum-cadmium alloys. The current collector may be processed to have fine irregularities on the surface thereof to enhance binding force of the current collector to the negative active material, and may be used in various forms including films, sheets, foils, nets, porous structures, foams, and non-woven fabrics.

The negative active material composition may be directly coated on the current collector to manufacture a negative electrode plate. In an embodiment, the negative electrode plate may be manufactured by casting the negative active material composition on a separate support to form a negative active material film, separating the negative active material film from the support, and laminating the negative active material film on a copper foil current collector. The negative electrode may have various shapes.

The negative active material composition may not only be used in the preparation of the electrode of lithium batteries, but may also be used in the preparation of a printable battery by being printed on a flexible electrode substrate.

Separately, a positive active material composition may be prepared by mixing a positive active material, a conductive agent, a binder, and a solvent to manufacture a positive electrode.

The positive active material may be a lithium-containing metal oxide that may be used in the art.

Examples of the lithium-containing metal oxide may include one of the compounds represented by the following formulae: $Li_aA_{1-b}B_bD_2$ (where $0.90 \le a \le 1.8$ and $0 \le b \le 0.5$); $Li_aE_{1-b}B_bO_{2-c}D_c$ (where $0.90 \le a \le 1.8$, $0 \le b \le 0.5$, and $0 \le c \le 0.05$); $LiE_{2-b}B_bO_{4-c}D_c$ (where $0 \le b \le 0.5$ and $0 \le c \le 0.05$); $Li_aNi_{1-b-c}Co_bB_cD_\alpha$ (where $0.90 \le a \le 1.8$, $0 \le b \le 0.5$, $0 \le c \le 0.05$, and $0 \le \alpha \le 2$); $Li_aNi_{1-b-c}Co_bB_cO_{2-\alpha}F_\alpha$ (where $0.90 \le a \le 1.8$, $0 \le b \le 0.5$, $0 \le c \le 0.05$, and $0 \le \alpha \le 2$); $Li_aNi_{1-b-c}Co_bB_cO_{2-\alpha}F_2$ (where $0.90 \le a \le 1.8$, $0 \le b \le 0.5$, $0 \le c \le 0.05$, and $0 \le \alpha \le 2$); $Li_aNi_{1-b-c}Mn_bB_cD_\alpha$ (where $0.90 \le a \le 1.8$, $0 \le b \le 0.5$, $0 \le c \le 0.05$, and $0 \le \alpha \le 2$); $Li_aNi_{1-b-c}Mn_bB_cO_{2-\alpha}F_\alpha$ (where $0.90 \le a \le 1.8$, $0 \le b \le 0.5$, $0 \le c \le 0.05$, and $0 \le \alpha \le 2$); $Li_aNi_{1-b-c}Mn_bB_cO_{2-\alpha}F_2$ (where $0.90 \le a \le 1.8$, $0 \le b \le 0.5$, $0 \le c \le 0.05$, and $0 \le \alpha \le 2$); $Li_aNi_bE_cG_dO_2$ (where $0.90 \le a \le 1.8$, $0 \le b \le 0.9$, $0 \le c \le 0.5$, and $0.001 \le d \le 0.1$); $Li_aNi_bCo_cMn_dGeO_2$ (where $0.90 \le a \le 1.8$, $0 \le b \le 0.9$, $0 \le c \le 0.5$, $0 \le d \le 0.5$, and $0.001 \le e \le 0.1$); $Li_aNiG_bO_2$ (where $0.90 \le a \le 1.8$ and $0.001 \le b \le 0.1$); $Li_aCoG_bO_2$ (where $0.90 \le a \le 1.8$ and $0.001 \le b \le 0.1$); $Li_aMnG_bO_2$ (where $0.90 \le a \le 1.8$ and $0.001 \le b \le 0.1$); $Li_aMn_2G_bO_4$ (where $0.90 \le a \le 1.8$ and $0.001 \le b \le 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ ($0 \le f \le 2$); $Li_{(3-f)}Fe_2(PO_4)_3$ ($0 \le f \le 2$); and $LiFePO_4$.

In the formulae above, A is nickel (Ni), cobalt (Co), manganese (Mn), or a combination thereof; B is aluminum (Al), nickel (Ni), cobalt (Co), manganese (Mn), chromium (Cr), iron (Fe), magnesium (Mg), strontium (Sr), vanadium (V), a rare earth element, or a combination thereof; D is oxygen (O), fluorine (F), sulfur (S), phosphorus (P), or a combination thereof; E is cobalt (Co), manganese (Mn), or a combination thereof; F is fluorine (F), sulfur (S), phosphorus (P), or a combination thereof; G is aluminum (Al), chromium (Cr), manganese (Mn), iron (Fe), magnesium (Mg), lanthanum (La), cerium (Ce), strontium (Sr), vanadium (V), or a combination thereof; Q is titanium (Ti), molybdenum (Mo), manganese (Mn), or a combination thereof; I is chromium (Cr), vanadium (V), iron (Fe), scandium (Sc), yttrium (Y), or a combination thereof; and J is vanadium (V), chromium (Cr), manganese (Mn), cobalt (Co), nickel (Ni), copper (Cu), or a combination thereof.

The compounds listed above may have a coating layer on the surface thereof. In an embodiment, a mixture of a compound without having a coating layer and a compound having a coating layer, the compounds being selected from the compounds listed above, may be used. The coating layer may include a compound of a coating element, such as an oxide, hydroxide, oxyhydroxide, oxycarbonate, or hydroxycarbonate of the coating element. The compound constituting the coating layer may be amorphous or crystalline. Examples of the coating element contained in the coating layer may be Mg, Al, Co, K, Na, Ca, Si, Ti, V, Sn, Ge, Ga, B, As, Zr, or a mixture thereof. The coating layer may be formed on the compound, used as the positive active material, by using the coating element via a method that does not adversely affect physical properties of the positive active material, for example, a spray coating method or an immersion method.

For example, $LiNiO_2$, $LiCoO_2$, $LiMn_xO_{2x}$ (x=1 and 2), $LiNi_{1-x}Mn_xO_2$ ($0<x<1$), $LiNi_{1-x-y}Co_xMn_yO_2$ ($0 \le x \le 0.5$ and $0 \le y \le 0.5$), $LiFeO_2$, $V_2O_5$, TiS, or MoS, may be used as the positive active material.

The conductive agent, the binder, and the solvent used in the positive active material composition may be the same as those of the negative active material composition described above. If desired, a plasticizer may further be added to the positive active material composition and the negative active material composition to form pores inside the electrode plates. The amounts of the positive active material, the conductive material, the binder, and the solvent may be the same level as those that may be used in lithium batteries.

A positive current collector may have a thickness of about 3 to about 500 μm, and a current collector that does not cause chemical changes in the fabricated battery and has high conductivity may be used. For example, stainless steel, aluminum, nickel, titanium, calcined carbon, and aluminum or stainless steel surface-treated with carbon, nickel, titanium, or silver, may be used. The current collector may have a surface on which fine irregularities may be formed to enhance adhesive force of the current collector to the positive active material. The current collector may be used in various forms including films, sheets, foils, nets, porous structures, foams, and non-woven fabrics.

The prepared positive active material composition may directly be coated on the positive current collector and dried to prepare a positive electrode plate. In an embodiment, the positive active material composition may be cast on a separate support, and then a film separated from the support is laminated on the positive current collector to prepare a positive electrode plate.

The positive electrode and the negative electrode may be separated from each other by a separator. A separator that may be used in lithium batteries may be used. For example, a separator that has low resistance to migration of ions of an electrolyte and excellent electrolytic solution-retaining ability may be used. Examples of the separator may include glass fiber, polyester, Teflon, polyethylene, polypropylene, polytetrafluoroethylene (PTFE), and a combination thereof, each of which may be a nonwoven fabric or a woven fabric. The separator has a pore diameter of about 0.01 to about 10 μm and a thickness of about 5 to about 300 μm.

A lithium salt-containing non-aqueous electrolyte may include a non-aqueous electrolyte and lithium. As the non-aqueous electrolyte, a non-aqueous electrolyte solution, an organic solid electrolyte, or an inorganic solid electrolyte may be used.

Examples of the non-aqueous electrolyte solution may include an aprotic organic solvent such as N-methyl-2-pyrrolidone, propylene carbonate, ethylene carbonate, butylene carbonate, dimethyl carbonate, diethyl carbonate, gamma-butyro lactone, 1,2-dimethoxy ethane, tetrahydrofuran, 2-methyl tetrahydrofuran, dimethylsulfoxide, 1,3-dioxolane, formamide, dimethylformamide, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

Examples of the organic solid electrolyte may include polyethylene derivatives, polyethylene oxide derivatives, polypropylene oxide derivatives, phosphoric acid ester polymers, poly agitation lysine, polyester sulfide, polyvinyl alcohol, polyvinylidene fluoride, and polymers containing ionic dissociation groups.

Examples of the inorganic solid electrolyte may include a nitride, halide, or sulfate of Li such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$.

The lithium salt may be a lithium salt used in lithium batteries. The lithium salt is a material that is readily soluble in the non-aqueous electrolyte and may include one or more of $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborate lithium, lower aliphatic carboxylic acid lithium, lithium tetraphenyl borate, or imide.

Lithium batteries may be classified into lithium ion batteries, lithium ion polymer batteries, and lithium polymer batteries according to types of separator and electrolyte. Lithium batteries may be classified into a cylindrical type, a rectangular type, a coin type, and a pouch type according to the shape of battery, and may be classified into a bulk type and a thin film type according to the size of battery. Lithium batteries may be used either as lithium primary batteries or lithium secondary batteries.

Figure 3:
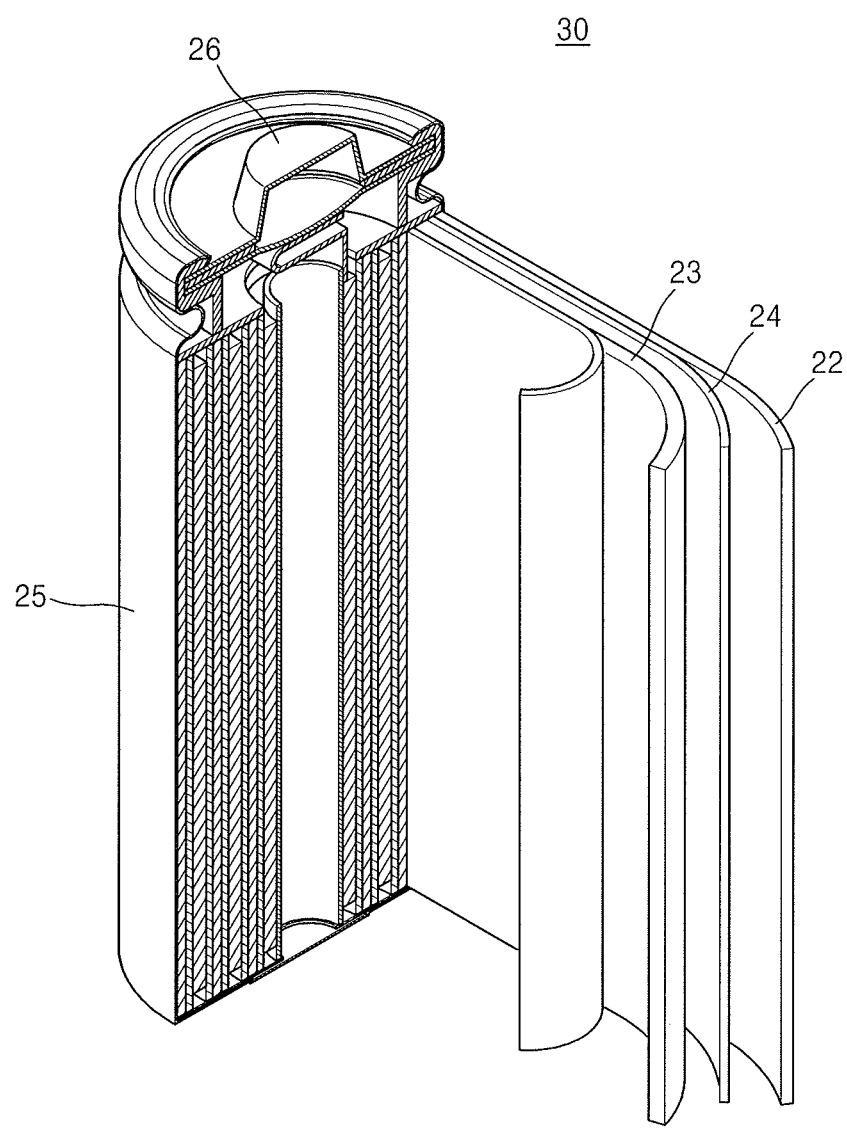
FIG. 3 illustrates a schematic view of a structure of a lithium battery according to an exemplary embodiment.

FIG. 3 illustrates a schematic diagram of a structure of a lithium battery 30 according to an exemplary embodiment. Referring to FIG. 3, the lithium battery 30 may include a positive electrode 23, a negative electrode 22, and a separator 24 disposed between the positive electrode 23 and the negative electrode 22. The positive electrode 23, the negative electrode 22, and the separator 24 may be wound or folded, and then accommodated in a battery case 25. Then, an electrolyte may be injected into the battery case 25 and the battery case 25 is sealed by a sealing member 26, and the manufacture of the lithium battery 30 may be completed. The battery case 25 may have a cylindrical shape, a rectangular shape, or a thin-film shape. The lithium battery may be a lithium ion battery.

The lithium battery may be used not only as a power source of small-sized devices such as mobile phones and laptop computers, but also as a unit battery of a battery module in middle or large-sized devices including a plurality of batteries.

Examples of the middle or large-sized devices include power tools, electric vehicles (EVs), hybrid electric vehicles (HEVs), plug-in hybrid electric vehicles (PHEVs), electric motorcycles such as E-bikes and E-scooters, electric golf carts, electric trucks, electric commercial vehicles, or energy storage systems. The lithium battery may be used in all applications requiring high-power output, high voltage, and high temperature conditions for operations.

The following Example and Comparative Examples are provided in order to highlight characteristics of one or more embodiments, but it will be understood that the Example and Comparative Examples are not to be construed as limiting the scope of the embodiments, nor are the Comparative Examples to be construed as being outside the scope of the embodiments. Further, it will be understood that the embodiments are not limited to the particular details described in the Example and Comparative Examples.

Preparation of Negative Active Material and Lithium Battery

Example 1

First, a Li metal layer having a thickness of about 5 nm was deposited on Si alloy powder ($Si_{60}Ti_{20}Ni_{20}$) having an average particle diameter (D50) of about 1 to about 5 μm by using a Li target in a vacuum by sputtering. Then, a $Li_2O$ layer having a thickness of about 5 nm was deposited thereon by using the Li target in an oxygen atmosphere, and a negative active material was prepared.

The prepared negative active material, a graphite plate, ketjen black as a conductive agent, and polyamideimide as a binder were mixed at a weight ratio of 70:15:5:2:8 to prepare a negative electrode slurry. Pure water was used as a solvent in the preparation of the negative electrode slurry in an amount such that a total solid content of the negative electrode slurry was 48% by weight. The negative electrode slurry was coated on a Cu-foil to a thickness of about 20 μm to form a thin plate. Then, the thin plate was dried at about 110° C. for more than 15 minutes and then further dried in a vacuum at 350° C. for 1 hour to prepare a negative electrode.

The negative electrode, Li(Ni—Co—Mn)$O_2$ as a positive electrode, and a polyethylene separator having a thickness of 20 μm (Product Name. Star20, Asahi) were used. An electrolyte prepared by dissolving 1.5M $LiPF_6$ in a mixed solvent including ethylene carbonate (EC), diethyl carbonate (DEC), and fluoroethylene carbonate (FEC) (a volume ratio of EC:DEC:FEC=5:70:25) was used to prepare coin cells.

Comparative Example 1

Coin cells were prepared in the same manner as in Example 1, except that Si nanoparticle powder not having a coating layer was used as a negative active material.

Comparative Example 2

Coin cells were prepared in the same manner as in Example 1, except that Si nanoparticle powder having only a Li$_2$O coating layer with a thickness of 5 nm was used as a negative active material.

Comparative Example 3

Coin cells were prepared in the same manner as in Example 1, except that Si nanoparticle powder having only a Li$_2$O coating layer with a thickness of 10 nm was used as a negative active material.

Evaluation Example 1

Evaluation of Lifespan Characteristics

Figure 4:
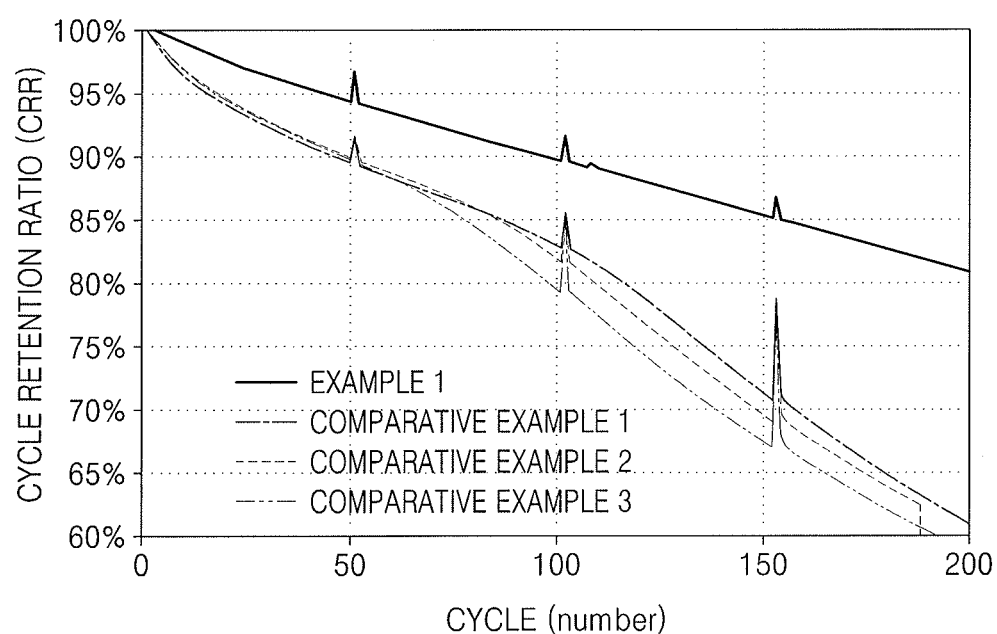
FIG. 4 illustrates a graph of charge/discharge characteristics of lithium batteries prepared according to Example 1 and Comparative Examples 1 to 3.

The coin cells prepared according to Example 1 and Comparative Examples 1 to 3 were charged in CC-CV mode at a rate of 0.2 C and 4.2V and a cutoff voltage of 0.05 C and discharged in CC-mode at a rate of 0.2 C and a cutoff voltage of 2.5 V once to perform formation. Then, the coin cells were charged in CC-CV mode at a rate of 1.0 C and 4.2 V and a cutoff voltage of 0.05 C and discharged in CC-mode at a rate of 1.0 C and a cutoff voltage of 2.5 V 200 times, and capacity retention ratios (CRR) with respect to charging and discharging were obtained. The results of capacity retention ratios are shown in FIG. 4. The capacity retention rate is defined by Equation 1.

Capacity retention ratio [%]=[Discharge capacity at each cycle/Discharge capacity at 1$^{St}$ cycle]×100     Equation 1.

Referring to FIG. 4, although the coin cells according to Comparative Examples 2 and 3 have the artificial SEI coating layer, lifespan characteristics thereof were similar to or poorer than those according to Comparative Example 1 not having the artificial SEI coating layer. On the contrary, the coin cells according to Example 1 have relatively high capacity retention rates.

By way of summation and review, lithium secondary batteries may generate electric energy by oxidation and reduction reactions occurring when lithium ions may be intercalated into/deintercalated from a positive electrode and a negative electrode, each of which may include an active material that may enable intercalation and deintercalation of lithium ions, with an organic electrolytic solution or a polymer electrolytic solution interposed between the positive electrode and the negative electrode.

Examples of the positive active material of lithium secondary batteries may include a lithium-containing transition metal oxide which may allow intercalation and deintercalation of lithium ions, such as lithium-cobalt oxide (LiCoO$_2$), lithium-nickel oxide (LiNiO$_2$), or lithium nickel cobalt manganese oxide (Li[NiCoMn]O$_2$ and Li[Ni$_{1-x-y}$Co$_x$M$_y$]O$_2$).

Carbonaceous materials in various forms, such as artificial graphite, natural graphite, and hard carbon, which may allow intercalation and deintercalation of lithium ions, and non-carbonaceous materials such as silicon (Si) may be used as negative active materials.

Such non-carbonaceous materials may exhibit a very high capacitance density ten times or greater than that of graphite. Capacity retention rate, charge/discharge efficiency, and lifespan characteristics of the non-carbonaceous material may deteriorate, for example, due to volumetric expansion and shrinkage during charging and discharging.

One or more exemplary embodiments include negative active materials that may be capable of improving lifespan characteristics of lithium batteries. One or more exemplary embodiments include lithium batteries including the negative active materials.

As described above, according to the one or more of the above exemplary embodiments, the negative active material may reduce excessive stress caused by expansion and shrinkage of the high capacity negative electrode material during charging and discharging by using the double coating layer, and the negative active material may improve efficiency and lifespan characteristics of lithium batteries. For example, the high-performance negative active material may have excellent capacity properties and cycle lifespan characteristics.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A negative active material, comprising:
   a non-carbonaceous core particle allowing doping or undoping of lithium ion; and
   a double coating layer formed on at least one portion of a surface of the non-carbonaceous core particle and including a first coating layer including a Li metal and a second coating layer Li$_2$O,
   wherein:
   the first coating layer is disposed on the surface of the non-carbonaceous core particle such that the first coating layer directly contacts the non-carbonaceous core particle,
   the first coating layer is formed of a material that is different from that of the non-carbonaceous core particle such that the first coating layer is distinct from the non-carbonaceous core particle,
   a thickness of the first coating layer is in a range a of about 0.1 nm to about 0.1 μm, and
   the second coating layer is disposed on the first coating layer such that the first coating layer is between the second coating layer and the non-carbonaceous core particle.

2. The negative active material as claimed in claim 1, wherein a thickness of the second coating layer is in a range of about 01 mu to about 1 μm.

3. The negative active, material as claimed in claim 1, wherein the non-carbonaceous core particle includes:
   Si;
   SiO$_x$ (0<x<2);
   a Si—Z alloy, where Z is an alkali metal, an alkali earth metal, an element of Groups XIII to XVI, a transition metal, a rare earth element, or a combination thereof except for Si, Sn, or $SnO_2$, the Si—Z alloy having a Si-based alloy structure including an inactive matrix including Si and one or more of an element of Groups II to XIV except for Si, and active Si nanoparticles dispersed in the inactive matrix;

a Sn—Z alloy, where Z is an alkali metal, an alkali earth metal, an element of Groups XIII to XVI, a transition metal, a rare earth element, or a combination thereof except for Sir, or a combination thereof.

4. The negative active material as claimed in claim 1, wherein an average particle diameter of the non-carbonaceous core particle is in a range of about 1 nm to about 50 μm.

5. The negative active material as claimed in claim 1, further comprising a crystalline carbonaceous material.

6. The negative active material as claimed in claim 5, wherein the non-carbonaceous core particle coated with the double coating layer and the crystalline carbonaceous material are mixed in a weight ratio of about 0.99:0.01 to about 0.01:0.99.

7. A lithium battery, comprising:
a negative electrode including the negative active material as claimed in claim 1;
a positive electrode opposite the negative electrode; and
an electrolyte between the negative electrode and the positive electrode.

8. The negative active material as claimed in claim 1, wherein:
the first coating layer consists of the Li metal, and
the second coating layer consists of the $Li_2O$.

* * * * *